(12) United States Patent
Maupin et al.

(10) Patent No.: US 8,076,620 B2
(45) Date of Patent: Dec. 13, 2011

(54) ANTI-OXIDATION FOOD PREPARATION DEVICE

(75) Inventors: Steven L. Maupin, Akron, OH (US); Lance P. Johnson, Uniontown, OH (US)

(73) Assignee: Lance P. Johnson, Uniontown, OH (US)

( * ) Notice: Subject to any disclaimer, the term of this patent is extended or adjusted under 35 U.S.C. 154(b) by 357 days.

(21) Appl. No.: 12/266,581

(22) Filed: Nov. 7, 2008

(65) Prior Publication Data
US 2010/0119668 A1 May 13, 2010

(51) Int. Cl.
*H05B 6/12* (2006.01)
*F27D 11/00* (2006.01)
(52) U.S. Cl. ........ 219/621; 219/432; 219/433; 219/438; 219/441
(58) Field of Classification Search .................. 219/395, 219/385, 620, 621, 628, 432, 545, 386, 433, 219/429, 435, 438, 441; 426/237, 241, 244, 426/523; 99/451; 439/18
See application file for complete search history.

(56) References Cited

U.S. PATENT DOCUMENTS

| | | | |
|---|---|---|---|
| 5,356,646 A | 10/1994 | Simic et al. | |
| 6,528,768 B1 | 3/2003 | Simic et al. | |
| 6,828,527 B2 | 12/2004 | Simic et al. | |
| 6,940,733 B2 * | 9/2005 | Schie et al. | 363/21.12 |
| 6,949,721 B2 | 9/2005 | Simic et al. | |
| 7,135,657 B2 | 11/2006 | Simic et al. | |
| 2002/0140377 A1* | 10/2002 | Backs et al. | 315/290 |

FOREIGN PATENT DOCUMENTS
JP          05344926 A  * 12/1993
JP          09238851 A  *  9/1997
WO       WO 9941950 A2 *  8/1999
* cited by examiner

*Primary Examiner* — Henry Yuen
*Assistant Examiner* — Hung D Nguyen
(74) *Attorney, Agent, or Firm* — Renner kenner Greive Bobak Taylor & Weber

(57) ABSTRACT

An anti-oxidation food preparation device includes a food preparation vessel having an electrically conductive body and a separate power supplying base. The base generates high frequency AC power that is transferred by a primary coil to as secondary coil maintained by the vessel. A rectification circuit converts the high frequency AC power into a rippled, rectified AC current that is supplied to the electrically conductive body of the vessel so as to create a reducing environment of available electrons for absorption by the food as it is prepared.

6 Claims, 2 Drawing Sheets

ANTI-OXIDATION FOOD PREPARATION DEVICE

TECHNICAL FIELD

The present invention relates generally to a device for inhibiting the oxidation of food during its preparation. Particularly, the present invention relates to a device for utilizing a rippled, rectified AC current as a source for supplying electrons to food, so as to diminish the oxidation of the food by thermal processes.

BACKGROUND ART

The ingestion of externally generated oxidative food products prepared, or otherwise cooked by a thermal process, such as cooking, cooling, storing, serving, and the like, may be carcinogenic. Such effect is believed to be the result of the depletion of electrons in the food as a result of the thermal excitation and oxidation of the food during preparation. However, by creating a reducing environment where electrons are supplied to the food during its preparation, the oxidative damage, as well as its carcinogenic potential, can be reduced.

To achieve such a result, cookware products have been developed that provides a food carrying vessel that maintains a pair of connection points that supply an electrical potential and electrical current to the food as it is being prepared. However, it would be advantageous to integrate the electron source into the food preparation vessel, such as a pot, rice cooker, slow cooker, grill, pan, coffee carafe, or any other cooking apparatus.

Therefore, there is a need in the art for an anti-oxidation food preparation device that has an integrated electron source. In addition, there is a need for an anti-oxidation food preparation device that supplies electrons to food during its preparation. Additionally, there is a need for an anti-oxidation food preparation device that counteracts the carcinogenic effects that occurs when food is prepared by a thermal process.

SUMMARY OF THE INVENTION

One aspect of the present invention provides a food preparation device for comprising a base maintaining a power source configured to generate a first power signal; a food preparation vessel to prepare food, said vessel maintaining a rectification circuit configured to receive a second power signal induced by said first power signal; and a rectification circuit maintained by said vessel and electrically coupled to said vessel, wherein when said rectification circuit receives said second power signal, said rectification circuit generates a rippled, rectified AC current signal from said second power signal, and supplies it to said vessel so as to create a reducing environment of available electrons for absorption by the food carried by the vessel.

Another aspect of the present invention comprises a method of preparing food comprising providing an electrically conductive vessel to prepare food, said vessel including a rectification circuit having a first and a second connection point electrically coupled to said vessel; said rectification circuit transforming a high frequency AC signal into a rippled, rectified AC current; and supplying said rippled, rectified AC current between said first and second connection points so as to create a reducing environment of available electrons for absorption by the food.

In still another aspect of the present invention provides a food preparation device for use with an inductive heating appliance comprising a vessel for preparing food, said vessel having a conductive body, wherein said receiving surface maintains a non-conductive coating disposed thereupon; a rectification circuit electrically coupled to said body; a first wire section embedded within said coating, said first wire section having each end coupled to said rectification circuit; a second wire section embedded within said coating, said second wire section coupled at one end to said first wire section and at the other end to said rectification circuit; wherein said rectification circuit converts the electrical current induced at the first wire section by the inductive heating appliance into a rippled, rectified AC current that is supplied to said conductive body by said rectification circuit, so as to create a reducing environment of available electrons for absorption by the food carried by said vessel.

DETAILED DESCRIPTION OF THE INVENTION

Figure 1:
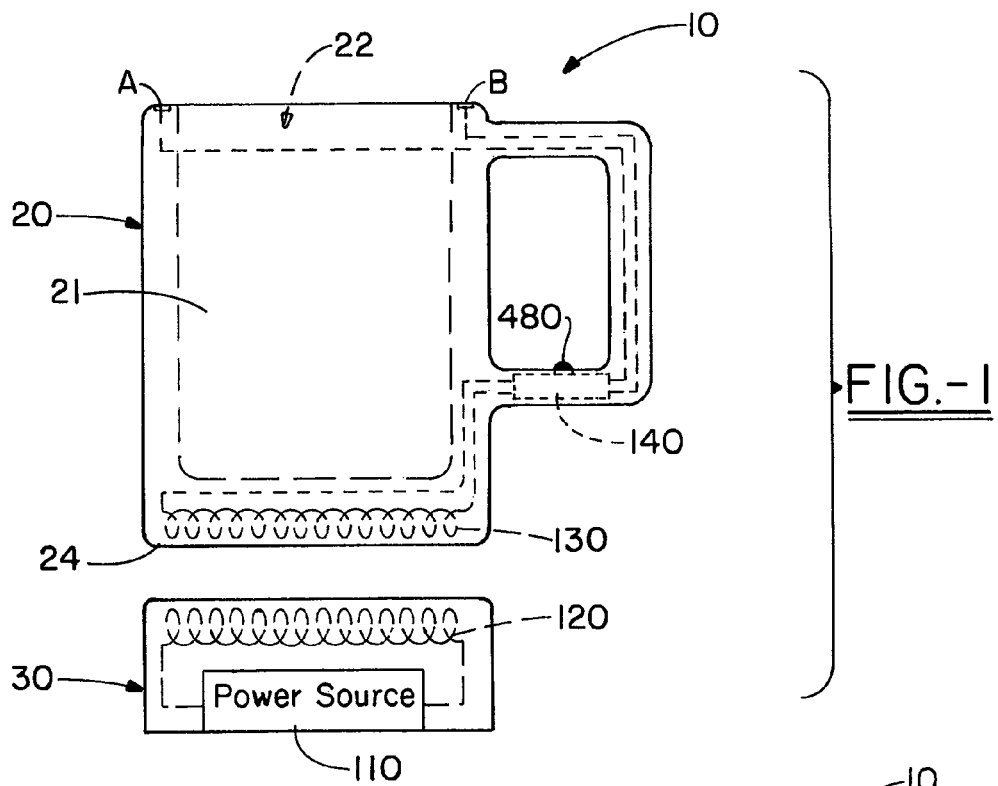
FIG. 1 is an elevational view of an anti-oxidation food preparation device having a base and an associated food preparation vessel in accordance with the concepts of the present invention.

An anti-oxidation food preparation device in accordance with the concepts of the present invention is generally referred to by the numeral 10, as shown in FIG. 1. However, prior to the discussion of the specific aspects of the device 10, it should be appreciated that the term "food preparation" as used herein is defined to include such processes as cooking, cooling, storing, serving, or any other food treatment or process. Continuing, the anti-oxidation food preparation device 10 comprises a food preparation vessel 20 having an electrically conductive body 21 that maintains a food preparation surface 22 and a power receiving surface 24. Although, the food preparation vessel 20 is shown as a coffee carafe in FIG. 1, it should be appreciated that the food preparation vessel 20 may comprise any desired utensil, of any shape or size, including but not limited to a carafe, a fry pan, a sauce pan, a wok, or the like. The vessel 20 is configured to receive power when selectively receives power from a base 30, which includes a power source 110 that supplies high frequency AC current to a primary coil 120. The current through the primary coil 120 induces an AC current in a secondary coil 130 embedded in the power receiving surface 24 of the vessel 20, which delivers the transferred power to a rectification circuit 140. Thus, during operation of the device 10, when the secondary coil 130 is brought into proximity with the primary coil 120 of the power source 110 the primary and secondary 120,130 coils become mutually coupled, thus allowing a current to be induced at the rectification circuit 140. The rectification circuit 140 rectifies the AC current received at the secondary coil 130 and generates a rippled, rectified AC current that flows between spaced connection points denoted "A" and "B" that are electrically coupled to the electrically conductive material comprising the vessel 20. As such the flowing current creates a reducing environment within the food preparation vessel so as to provide a source of electrons, which may be absorbed into the food.

Figure 2:
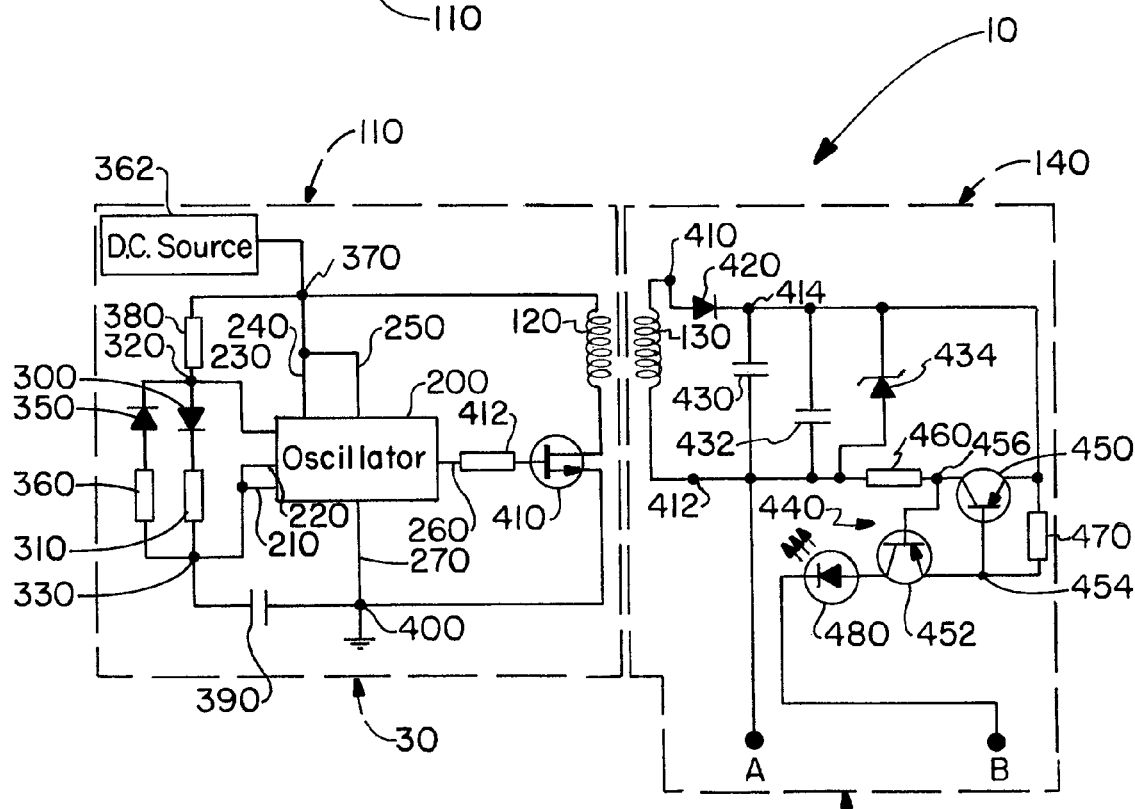
FIG. 2 is a schematic view of a power source maintained by the base, and the rectification circuit maintained by the food preparation device in accordance with the concepts of the present invention.

Continuing to FIG. 2, the power source 110 of the anti-oxidation food preparation device 100 comprises an oscillator 200, such as a 555 timer for example, although it is contemplated that any other suitable oscillator circuit may be utilized. Specifically, the oscillator 200 includes a trigger terminal 210, a threshold terminal 220, a discharge terminal 230, a power input terminal 240, a reset terminal 250, an output terminal 260, and a ground terminal 270. Coupled between the discharge terminal 230 and the threshold terminal 220 of the oscillator 200 is a series coupled diode 300 and resistor 310. The diode 300 and resistor 310 are oriented such that the cathode of the diode 300 is coupled to one end of the resistor 310, while the other end of the resistor 310 is coupled to the threshold terminal 220 and the anode of the diode 300 is coupled to the discharge terminal 230. Coupled in parallel with the diode 300 and the resistor 310 at nodes 320 and 330 is a series coupled diode 350 and resistor 360. The diode 350 and the resistor 360 are oriented such that the anode of the diode 350 is coupled to one end of the resistor 360, while the other end of the resistor 360 is coupled to the node 330. Furthermore, the cathode of the diode 350 is coupled to the discharge terminal 230 of the oscillator 200. Also coupled to node 330 is the trigger terminal 210 of the oscillator 200, while the reset terminal 250 and the power input terminal 240 and a power supply 362 are coupled together at a node 370. Coupled between node 320 and node 370 is a resistor 380, while a capacitor 390 is coupled at node 330 and the ground terminal 270 at a node 400. A MOSFET transistor 410 is coupled by its gate terminal G to the output terminal 260 of the oscillator 200 via a resistor 412. Additionally, the coil 120, is coupled between node 370 and the drain terminal D of the transistor 410, while the source terminal S of the transistor 410 is coupled to ground at node 400. As such, the contents of the power source 110 and coil 120 may be maintained within an enclosed housing that may comprise the base 30.

The rectification circuit 140 is maintained by the food preparation vessel 20, and in one aspect the rectification circuit 140 may be maintained by a handle maintained by the vessel 20. However, the rectification circuit 140 may be located in any suitable region about the vessel 20. The rectification circuit 140 comprises the secondary coil 130, which is coupled across nodes 410 and 412. As will be discussed, later the secondary coil 130 is configured to be coupled through mutual inductance with the primary coil 120, such that the primary and secondary coils 120,130 function together as a transformer. Coupled at its anode to the secondary coil 130 and at its cathode to a node 414 is a schottky diode 420. Coupled in parallel between nodes 414 and 412 are capacitors 430,432 and a zener diode 434. Electrical current from node 414 is supplied to a current regulator 440. The current regulator 440 comprises a transistor 450 and a transistor 452, which may comprise pnp-type bipolar junction transistors (BJT). Although pnp-type BJT transistors are shown, npn BJT transistors, as well as p-type or n-type MOSFETS (metal oxide semiconductor field effect transistors), or a combination of both may also be utilized using known techniques. The transistors 450 and 452 are coupled such that the base terminal (B) of transistor 450 is coupled to the emitter terminal (E) of the transistor 452 at a node 454, while the emitter terminal (E) of the transistor 450 is coupled to node 414. Whereas the base terminal (B) of the transistor 452 is coupled to the collector terminal (C) of the transistor 450 at a node 456. In addition, a resistor 460 is coupled between node 456 and the node 412, while a resistor 470 is coupled between node 414 and the node 454. It should be appreciated that the resistance values of resistors 460 and 470 may be changed so that the current supplied from the current regulator 440 may be increased or decreased to a desired level. Coupled to the collector (C) terminal of the transistor 452 is the anode of a light emitting diode (LED) 480. During operation of the device 100, the LED 480 illuminates when electrical current is supplied by the regulator 440 of the rectification circuit 140. To enable the electrical current supplied from the regulator 440 to pass through the body 21 of the food preparation vessel 20, connection points A and B are embedded within the vessel 20. Specifically, a connection point A is coupled to node 412, while a connection point denoted B is coupled to the cathode of the LED 480.

Thus, during operation of the device 10, the oscillator 200 switches transistor 410 so as to generate a pulse train signal, such as a 40 KHz square wave signal for example, which is supplied to the primary coil 120. However, it should be appreciated that the oscillator 200 may be configured to generate other pulse train waveforms, at other frequencies if desired. Next, the food preparation vessel 20 is brought into proximity of the power source 110 maintained by the base 30, so that the secondary coil 130 is adjacent the primary coil 120 so that the coils 120,130 can become mutually coupled. Once adjacently arranged, the square wave signal in the primary coil 120 induces a distorted, ringing square wave signal in the secondary coil 130. The ringing square wave signal is then half-wave rectified by the schottky diode 420 of the rectification circuit 140. The capacitor 430 filters the half-wave rectified signal to eliminate a portion of the high frequency components that are superimposed on the half-wave rectified signal generated from the ringing. As a result, the voltage across the capacitors 430 and 432 comprises a partially rectified AC signal with an amount of ripple superimposed thereupon. Furthermore, the capacitor 432 serves to store energy in order to supply power to the regulator 440 to enable the device 10 to continue to provide the anti-oxidation or reducing environment when the food preparation vessel 20 is not adjacent the base 30. In one aspect, the capacity of the capacitor 432 may be configured so that it may provide an amount of energy to power the food preparation vessel 20 for any desired period of time, such as 30-45 minutes for example. The zener diode 434 serves as a protection device, and prevents the voltage across the capacitor 432 from rising above the zener voltage of the zener diode 434.

The electrical current supplied from the node 414 is then provided to the current regulator 440 where it is adjusted to a desired level for supply to the food preparation vessel 20 via the connection points A and B. It should be appreciated that the connection points A and B are spaced apart and electrically coupled to the conductive body 21 of the vessel. In one aspect, the connection points A and B may be spaced, such that they are disposed at diametrically opposite sides of the vessel 20, although not required, as the connection points A and B may be located at any point about the body 21 as long as the connection points A and B are spaced apart. In addition, the LED 480 is provided to give a visual indication as to when electrical current is being supplied between the connection points A and B, so as to create the reducing environment. In addition, the LED 480 also serves as a diagnostic device, such that if the LED 480 fails to light up at all it may be concluded that an electrical fault has occurred within the rectification circuit 140 or that the connection points A and B have become unattached from the food preparation vessel. Thus, when the power receiving surface 24 of the food preparation vessel 20 is disposed upon the power source 110, the current regulator 440 is provided with a rippled, rectified AC current, whereas when the food preparation vessel 20 is not disposed upon the power source 110, the current regulator 440 receives a exponentially decaying voltage from the capacitor 432 as it discharges. In addition to supplying electrical current to the vessel 20, it should also be appreciated that the power supplied by the connection points A and B may also be utilized to power other auxiliary components, such as timers, lights, voice indicators, or any other electronic item.

Figure 3:
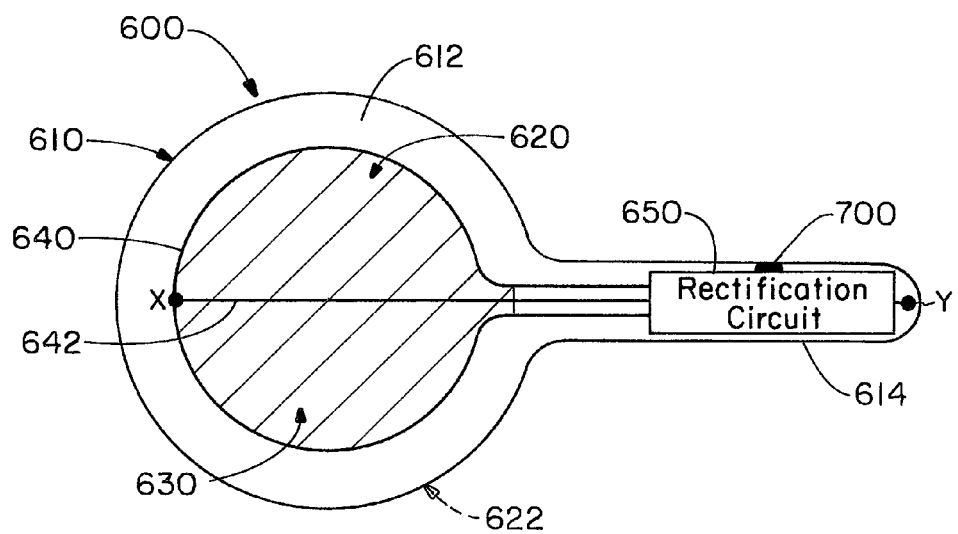
FIG. 3 is a bottom plan view of an alternative embodiment of the anti-oxidation food preparation device having a food preparation vessel and rectification circuit in accordance with the concepts of the present invention.
Figure 4:
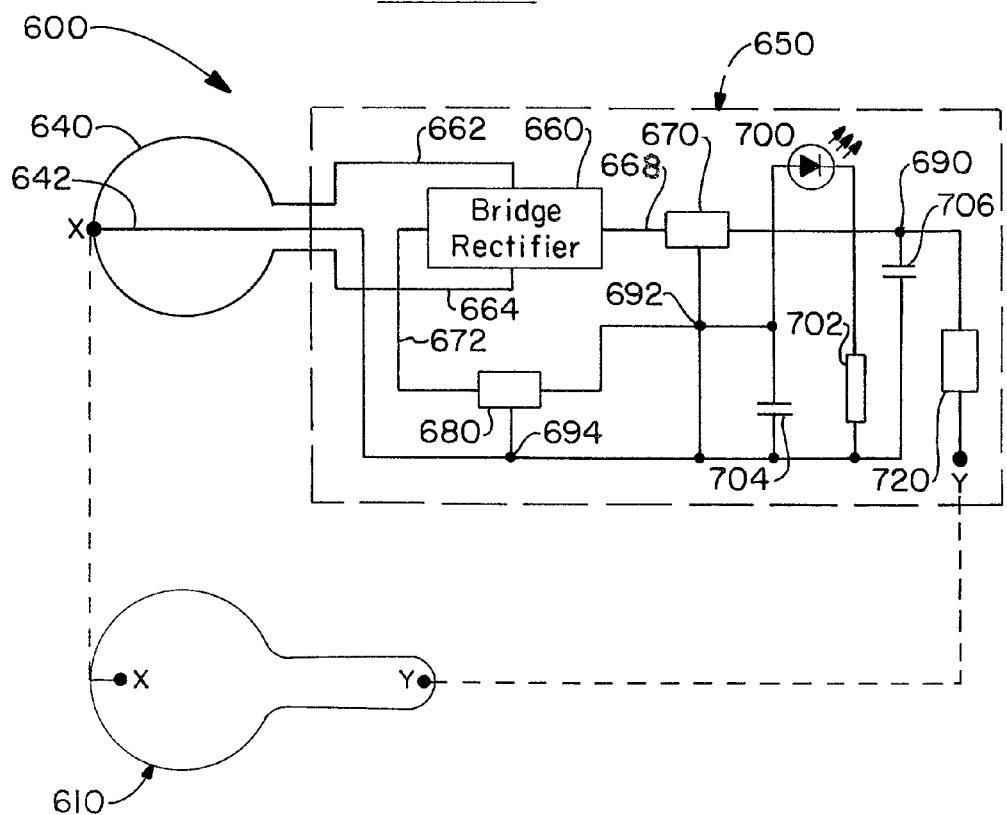
FIG. 4 is a schematic view of the rectification circuit maintained by the food preparation vessel shown in FIG. 3 in accordance with the concepts of the present invention.

Another embodiment of the anti-oxidation food preparation device is generally referred to by the numeral 600, as shown in FIG. 3. In particular, this embodiment maintains a food preparation vessel 610 that is configured for use with an existing inductive heating or cooking appliance or surface. As such, the power source 110 maintained by the base 30, as discussed above in regard to device 10, is not needed when the food preparation vessel 610 is utilized with an existing inductive heating or cooking surface. Specifically, the food preparation vessel 610 may comprise any utensil, or item used in the preparation or cooking of food, including but not limited to a fry pan, sauce pan, wok, carafe for example, which may be configured for use with an induction cooking or heating element. As shown in FIG. 3, the food preparation vessel 610 may comprise a fry pan having an electrically conductive body 612 and a handle 614, which are electrically coupled together. The body 612 of the vessel 610 includes a power receiving surface 620 and a food preparation surface 622. Disposed upon the power receiving surface 620 is an electrically non-conductive layer or dielectric layer of material 630, which is configured to encapsulate a looped wire section 640 and a central wire section 642. The looped wire section 640 is arranged as a loop about the power receiving surface 620 of the vessel 610, while the central wire section 642 is coupled at one end to the looped wire section 640 at a connection point denoted "X," which serves as the anode of the device 600. While the wire sections 640 and 642 are electrically isolated from the food preparation vessel 610, it should be appreciated that the connection point X is electrically coupled to the conductive body 612 of the vessel 610. The remaining ends of the central wire section 642 and both ends of the looped wire section 640 are coupled to a rectification circuit while the other end of the central wire section 642 is coupled to a rectification circuit 650. It should also be appreciated that the central wire 642 may be eliminated, while still allowing the device 600 to impart the anti-oxidative effects to the food prepared via the vessel 610.

The rectification circuit 650 may be disposed within the handle 614 of the vessel 610, but is not required, and serves to control the voltage induced at the looped wire section 640 from the inductive heating or cooking surface of an inductive appliance (not shown). Specifically, the rectification circuit 650 comprises a bridge rectifier 660 that is coupled to the looped wire section 640 at input terminals 662 and 664, so as to produce a positive and a negative voltage with respect to connection point X. In one aspect, the bridge rectifier 660 may comprise a high-speed bridge rectifier, although any other suitable rectifier may be utilized. Coupled to a positive output 668 of the bridge rectifier 660 is a voltage regulator 670 while a negative output 672 of the bridge rectifier 660 is coupled to a voltage regulator 680. In addition, the regulator 670 is coupled to a node 690 and to a node 692, while the regulator 680 is coupled to the node 692 and to a ground or reference node 694. Between nodes 692 and 694 are a series coupled LED (light emitting diode) 700 and resistor 702 that are coupled in parallel with a capacitor 704. The LED 700 may be used in a similar manner as the LED 480 discussed above with regard to device 10. In addition, a capacitor 706 is coupled between the node 690 and the ground node 694. Moreover, a current regulator 720 is coupled between node 690 and a connection point designated "Y," which serves as the cathode of the device 600. It should be appreciated that the connection point Y is electrically coupled to the conductive portion of the handle 614 that is also electrically coupled to the body 612 of the food preparation vessel 610. As such, a current is able to flow between the connection point X and connection point Y via the electrically conductive body 612 of the vessel during the operation of the device 600.

Thus, when the power receiving surface 620 of the vessel 610 is brought near the inductive cooking or heating appliance, a high frequency alternating current (AC) is induced at the looped wire section 640 of the food preparation vessel 610. The bridge rectifier 660 of the rectification circuit 650 rectifies the high frequency alternating current (AC) and outputs a positive voltage and a negative voltage with respect to connection point X. It should be appreciated that the rectified voltage is a rippled, rectified AC current. The rippled, rectified AC current is then regulated with the voltage regulators 670 and 680 to ensure that the rectification circuit 650 operates at a maximum fixed voltage, regardless of the type of induction cooking or heating appliance used to supply energy to the cooking vessel 610. The capacitor 704 is coupled across the output of the voltage regulators 670 and 680, and serves to supply supplemental power to the current regulator 720 and the LED 700 when the food preparation vessel 610 is not receiving power from the inductive heating or cooking appliance, or when the inductive heating or cooking appliance is turned off during the temperature regulation function of the inductive heating or cooking appliance. In one aspect, the rectification circuit 650 may be sealed within the handle 614 of the vessel 610, so as to form an at least water resistant seal. However, the rectification circuit 650 may be associated with any portion of the vessel 610.

Electrical current from the current regulator 720 enters the conductive body 612 of the cooking vessel 610 via connection point Y and exits at connection point X. The current flow between connection points Y and X forms a reducing environment for the food being prepared upon the surface 622 of the vessel 610. That is, the reducing environment provides a source of available electrons, which may be absorbed by the food, thus reducing the amount of oxidation the food is subjected to during the preparation process.

In another aspect of the present invention, the rectification circuit 650 may be modified using known techniques to store energy to enable the anti-oxidation process to be carried out when the cooking vessel 610 is not disposed upon the heating or cooking surface of the inductive appliance, or when the inductive appliance is switched off to regulate temperature during cooking.

It will, therefore, be appreciated that one advantage of one or more embodiments of the present invention is that an anti-oxidation food preparation device that provides a food preparation vessel converts a high frequency AC signal into rippled, rectified AC current for delivery to the vessel so as to provide a reducing environment of available electrons for absorption by the food. Another advantage of the present invention is that power is transferred from a base to a rectification circuit maintained by the vessel by mutual inductance via coils disposed in the base and the vessel. Still another advantage of the present invention is that a current regulator maintained by the rectification circuit may be adjusted so that the amount of magnitude of the rippled, rectified AC current can be altered, to create a reducing environment having a desired level of available electrons for absorption by the food.

A further advantage of the present invention is that the rectification circuit may be maintained or otherwise carried by the vessel.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms that may come within the language and scope of the attached claims.

What is claimed is:

1. A food preparation device for comprising:
    a base maintaining a power source configured to generate a first power signal;
    an electrically conductive food preparation vessel to prepare food; and
    a rectification circuit maintained by said vessel and electrically coupled to said vessel, said rectification circuit comprising:
        a coil configured to receive a second power signal induced by said first power signal;
        a schottky diode arranged in series with one end said coil;
        a capacitor arranged in parallel with said coil and said diode, such that the cathode of said diode is coupled to one end of said capacitor, and said coil is coupled to another end of said capacitor to form a first connection point that is electrically coupled to said vessel; and
        a current regulator coupled to said capacitor, said current regulator having an output that forms a second connection point that is electrically coupled to said vessel and spaced apart from said first connection point, said current regulator configured to control the magnitude of said current delivered to said vessel;
    wherein when said rectification circuit receives said second power signal, said rectification circuit generates a rippled, rectified AC current signal from said second power signal, and supplies it to said vessel at said second connection point, so as to create a reducing environment of available electrons for absorption by the food carried by the vessel.

2. The food preparation device of claim 1, wherein said first power signal comprises a square wave.

3. A food preparation device for use with an inductive heating appliance comprising:
    a vessel for preparing food, said vessel having a conductive body having a receiving surface, wherein said receiving surface maintains a non-conductive coating disposed thereupon;
    a rectification circuit comprising:
        a bridge rectifier;
        a voltage regulator coupled to the output of said bridge rectifier; and
        a current regulator coupled to the output of said voltage regulator, said current regulator coupled to said conductive body;
    a first wire section embedded within said coating, said first wire section having each end coupled to said bridge rectifier; and
    a second wire section embedded within said coating, said second wire section coupled at one end to said first wire section and at the other end to said rectification circuit;
    wherein said rectification circuit converts the electrical current induced at said first wire section by the inductive heating appliance into a rippled, rectified AC current that is supplied to said conductive body by said current regulator, so as to create a reducing environment of available electrons for absorption by the food carried by said vessel.

4. The food preparation system of claim 3, wherein said rectification circuit is integral with said body.

5. The food preparation system of claim 3, wherein said first wire section substantially forms a loop.

6. The food preparation system of claim 3, further comprising:
    a capacitor coupled to said voltage regulator to store energy when said vessel does not receive power from the inductive heating appliance.

* * * * *